(12) United States Patent
Daye et al.

(10) Patent No.: US 8,942,365 B2
(45) Date of Patent: Jan. 27, 2015

(54) MONITORING AND PROVIDING ACCESS TO BACK TO BACK SCHEDULED CONFERENCE CALLS

(71) Applicant: International Business Machines Corporation, Armonk, NY (US)

(72) Inventors: Sheri G. Daye, Boca Raton, FL (US); Peeyush Jaiswal, Boca Raton, FL (US)

(*) Notice: Subject to any disclaimer, the term of this patent is extended or adjusted under 35 U.S.C. 154(b) by 0 days.

(21) Appl. No.: 13/848,108

(22) Filed: Mar. 21, 2013

(65) Prior Publication Data

US 2014/0286485 A1   Sep. 25, 2014

(51) Int. Cl.
*H04M 3/42* (2006.01)
*H04M 3/56* (2006.01)

(52) U.S. Cl.
CPC ........................................ *H04M 3/56* (2013.01)
USPC .................. 379/202.01; 379/201.01; 455/416

(58) Field of Classification Search
CPC ....... H04M 3/56; H04M 1/663; H04M 1/667; H04L 12/1818; H04L 12/1822
USPC .......... 379/202.01, 201.01, 207.13; 455/416, 455/414.1
See application file for complete search history.

(56) References Cited

U.S. PATENT DOCUMENTS

| 8,472,602 | B2* | 6/2013 | Chen et al. | 379/202.01 |
| 2008/0253546 | A1 | 10/2008 | Chen et al. | |
| 2011/0135080 | A1 | 6/2011 | Lingafelt et al. | |
| 2012/0269335 | A1 | 10/2012 | Goguen et al. | |
| 2013/0251132 | A1* | 9/2013 | Manor | 379/202.01 |

* cited by examiner

*Primary Examiner* — Thjuan K Addy
(74) *Attorney, Agent, or Firm* — Maeve L. McCarthy; John Pivnichny

(57) ABSTRACT

A method for monitoring and providing access to back to back scheduled conference calls within a teleconferencing system. The method includes receiving a call and a password entry from a caller. The method includes determining the password entry is valid for a scheduled conference call. The method includes determining the scheduled conference call is scheduled back to back with a previous conference call and that the previous conference call is not over. The method then includes determining the password entry is a specific password, wherein the specific password is issued only to callers accessing back to back scheduled conference calls and placing the caller on hold.

18 Claims, 3 Drawing Sheets

US 8,942,365 B2

MONITORING AND PROVIDING ACCESS TO BACK TO BACK SCHEDULED CONFERENCE CALLS

FIELD OF THE INVENTION

The present invention relates generally to the field of teleconferencing systems, and more particularly to monitoring and providing access to back to back scheduled conference calls.

BACKGROUND OF THE INVENTION

It is now common practice for businesses, corporations, corporate executives and other business professionals to communicate with clients, offices, and employees using conference calls. A conference call is a telephone call in which the calling party wishes to have more than one called party involved. Participants are typically able to call in to the conference call by dialing a telephone number that connects to a conference bridge, which is a central server or type of equipment that links telephone lines and maintains the various communications paths to client devices being used by parties to participate in the conference. Businesses commonly use a specialized service provider who maintains the conference bridge, or who provides the phone numbers and passwords that participants dial to access the meeting or conference call. Common applications of conference calls are client meetings or sales presentations, project meeting and updates, team meetings, training classes and communication with employees who work in different locations. Often, especially in large corporations, a person may have multiple conference call meetings scheduled for a single day, with a high potential of having calls scheduled back to back in each day. As with in-person meetings, conference calls may run over an allotted amount of time, causing problems for the person with the scheduled back to back calls and for other participants joining any of the scheduled conference calls.

SUMMARY

Embodiments of the present invention disclose a computer implemented method, computer program product, and computer system for monitoring and providing access to back to back scheduled conference calls within a teleconferencing system. The method includes receiving a call from a caller and receiving a password entry from the caller. The method includes determining the password entry is valid for a scheduled conference call. The method includes determining the scheduled conference call is scheduled back to back with a previous conference call and that the previous conference call is not over. The method then includes determining the password entry is a specific password, wherein the specific password is issued only to callers accessing back to back scheduled conference calls and based, at least in part, upon determining the password entry is the specific password, placing the caller on hold.

DETAILED DESCRIPTION

Figure 1:
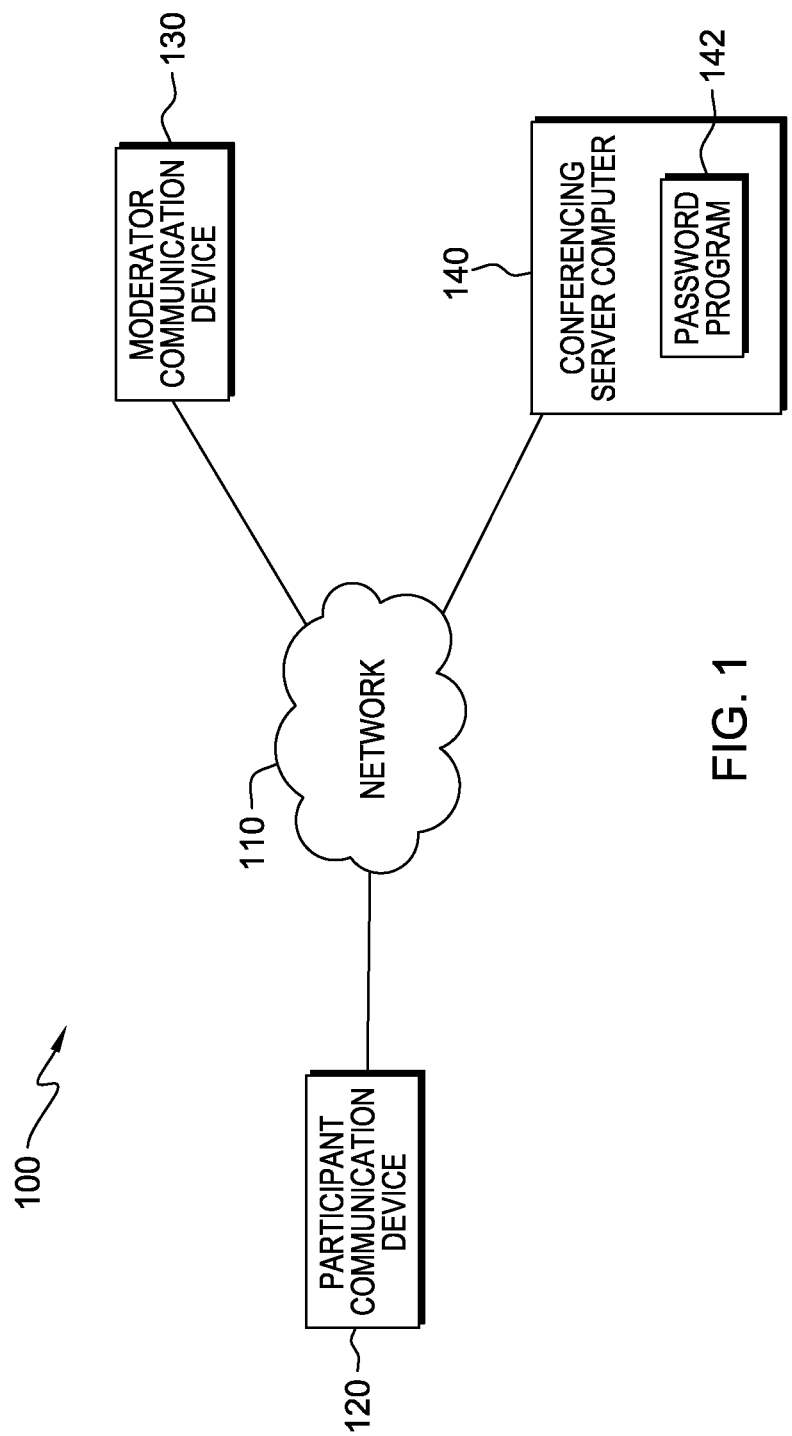
FIG. 1 is a functional block diagram illustrating a teleconferencing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable storage medium(s) having computer readable program code/instructions embodied thereon.

Any combination of computer-readable storage media may be utilized. A computer-readable storage medium is, for example, an electronic, magnetic, optical, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code is transmitted using any appropriate medium, including, for example, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer, other programmable data processing apparatus, or other devices to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a teleconferencing environment, generally designated 100, in accordance with one embodiment of the present invention.

Teleconferencing environment 100 includes participant communication device 120, moderator communication device 130 and conferencing server computer 140, all interconnected via network 110. Network 110 can be, for example, a local area network (LAN), a wide area network (WAN) such as the Internet, or a combination of the two, and can include wired, wireless, or fiber optic connections. Network 110 can also be a telephone network or telecommunications network, including a fixed line network, a wireless network, or a private telephone network. In general, network 110 can be any combination of connections and protocols that will support communication between participant communication device 120, moderator communication device 130 and conferencing server computer 140.

Participant communication device 120 or moderator communication device 130 can be a laptop computer, a tablet computer, a netbook computer, a personal computer (PC), a desktop computer, a personal digital assistant (PDA), a smart phone, or any programmable electronic device capable of communicating with each other and with conferencing server computer 140, and with telecommunications capabilities through, for example, a microphone, a telephone, or any other device capable of receiving and converting speech or other sounds into an electrical signal to be transmitted through teleconferencing environment 100 via network 110. In exemplary embodiments of the present invention, participant communication device 120 or moderator communication device 130 can be a PDA, a smart phone, a mobile or cellular phone, a landline telephone, or a cordless telephone. Users of participant communication device 120 and moderator communication device 130 operate each device to access conference calls provided by conferencing server computer 140. While in FIG. 1, only one participant communication device 120 is shown, one of skill in the art will appreciate that within teleconferencing environment 100 there can be any number of participants operating a communication device such as participant communication device 120 to participate in a scheduled conference call.

Conferencing server computer 140 includes password program 142. Conferencing server computer 140 can be a laptop computer, a tablet computer, a netbook computer, a PC, a desktop computer, a PDA, a smart phone or any programmable electronic device capable of communicating with participant communication device 120 and moderator communication device 130 via network 110. In an exemplary embodiment of the present invention, conferencing server computer 140 is a conference bridge allowing a large number of participants to participate in conference calls which includes software capabilities such as instructing callers to enter a password before being connected to a call. Businesses may provide their own conferencing server computer or use an available service that provides teleconference hosting using a conference bridge. Conferencing server computer 140 can include internal and external hardware components, as depicted and described in further detail with respect to FIG. 3.

Password program 142 monitors back to back scheduled conference calls within teleconferencing environment 100 and determines whether a scheduled conference call is running over time. Back to back scheduled conference calls are conference calls scheduled immediately preceding and immediately following one another. When a conference call runs past a scheduled end time, password program 142 determines whether a caller trying to join a next scheduled call, for example, a caller operating on participant communication device 120, has entered a transient password for the next scheduled call. Entering the transient password for the next scheduled call will allow the caller access to the conference call, but password program 142 will place the caller in hold until the previous conference call ends, or a moderator, for example, one operating on moderator communication device 130, allows the caller access to the next scheduled call.

Figure 2:
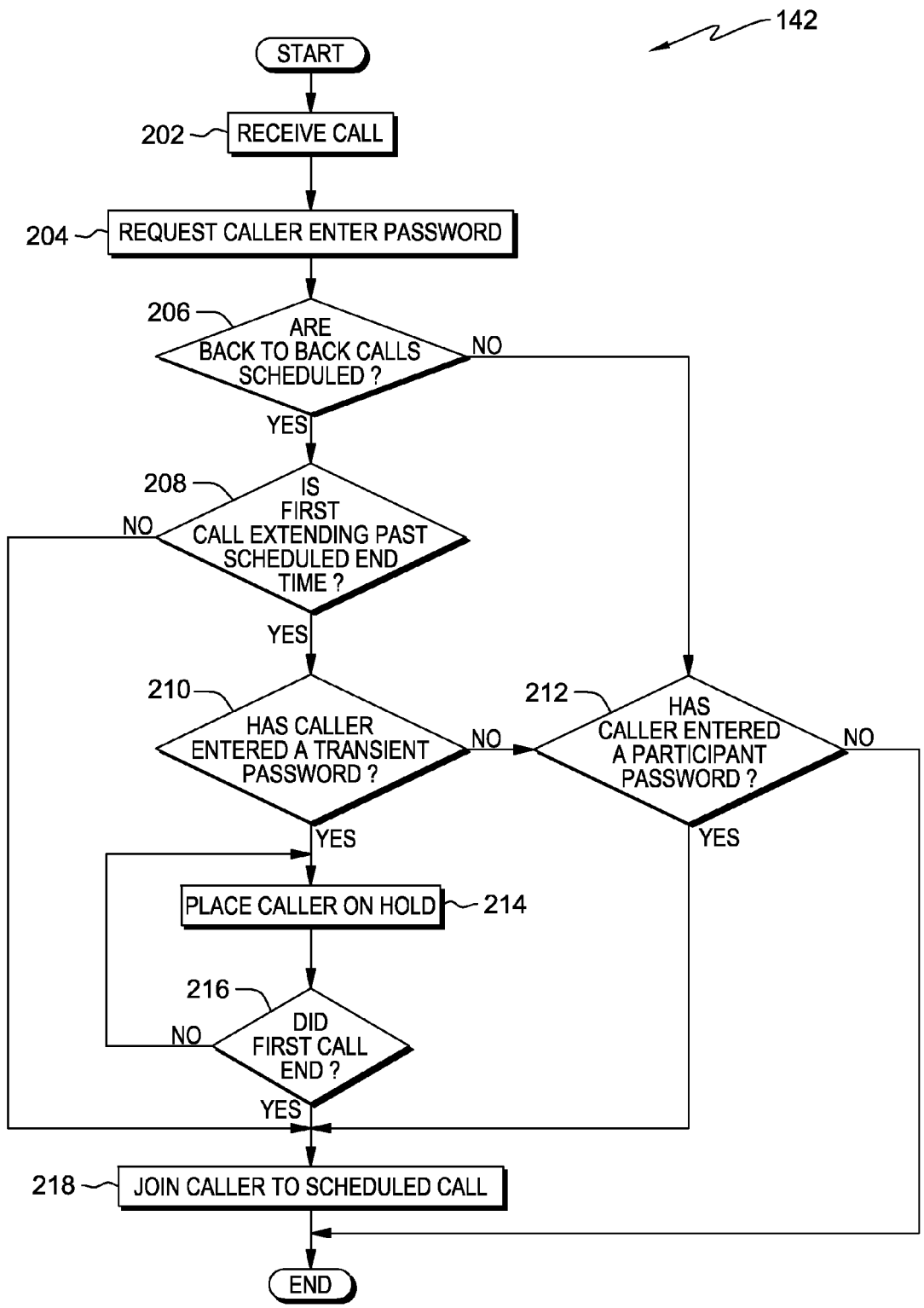
FIG. 2 is a flowchart depicting operational steps of the password program of FIG. 1 for monitoring and providing access to back to back scheduled conference calls within the teleconferencing environment, in accordance with an embodiment of the present invention.

FIG. 2 is a flowchart depicting operational steps of password program 142 for monitoring and providing access to back to back scheduled conference calls within teleconferencing environment 100, in accordance with an embodiment of the present invention.

Password program 142 receives a call from a caller (step 202) and requests the caller enter a valid password (step 204). In an exemplary embodiment of the present invention, the caller is sent an invitation to participate in a conference call and is provided with the conference call phone number and a password to access the call. Upon calling into a conferencing server or conference bridge, for example, conferencing server computer 140, the caller is required to enter a password to access a scheduled conference call. Password program 142 verifies that the entered password is valid and corresponds to passwords included in invitations to scheduled conference calls.

Password program 142 determines whether back to back calls are scheduled (decision block 206). Password program 142 can receive scheduled call information from user input, for example, a moderator sending schedule information to conferencing server computer 140, or password program 142 can request access to a calendar or scheduling device of the moderator.

If there are not back to back calls scheduled (decision block 206, no branch), password program 142 determines whether the caller entered a participant password (decision block 212). In an exemplary embodiment of the present invention, when an invitation is issued to a participant to participate in a conference call, either a "participant" password or a "transient" password is included in the invitation. A participant password is used for situations when only one call is scheduled, or there is sufficient time between scheduled calls so it is unlikely scheduled calls will run into each other. A transient password is a specific password included in invitations when back to back conference calls are scheduled.

If the caller has not entered a participant password (decision block 212, no branch), the caller does not have access to the scheduled call. In various embodiments of the present invention, if the caller does not enter a participant password, password program 142 may request the caller re-enter a password. If the caller has entered a participant password (decision block 212, yes branch), password program 142 joins the caller to the scheduled call (step 218).

If there are back to back calls scheduled (decision block 206, yes branch), password program 142 determines whether a first scheduled call is extending past the scheduled end time (decision block 208). If the call is not extending past the scheduled end time (decision block 208, no branch), password program 142 proceeds to join the caller to the scheduled conference call, based on the valid password entered by the caller (step 218). In an alternate embodiment of the present invention, if a current scheduled call did not extend past the scheduled end time, but an invited caller did not call in at the scheduled time, for example, due to another meeting the caller was participating in, password program 142, after a certain pre-determined time period, may block the invited caller from the current scheduled call and issue a new transient password to the invited caller for a later scheduled call. When the invited caller calls in to the current scheduled call, password program 142 will place the caller on hold for the next scheduled call, based on the new transient password entered. The pre-determined time period can be set by a moderator for the scheduled conference call, for example, a user of moderator communication device 130, or an operator of conferencing server computer 140.

If the call is extending past the scheduled end time (decision block 208, yes branch), password program 142 determines whether the caller has entered a transient password (decision block 210). If the caller has not entered a transient password (decision block 210, no branch), password program 142 determines whether the caller has entered a participant password (decision block 212). In various embodiments of the present invention, a moderator with access to conferencing server computer 140 or other operator of conferencing server computer 140 may elect to provide all invited participants with only a participant password, based on beliefs a scheduled call will not run past the scheduled end time or determinations the subject matter of scheduled calls is not private.

If the caller has entered a transient password (decision block 210, yes branch), password program 142 places the caller on hold (step 214). In an exemplary embodiment of the present invention, the caller will be on hold until the previously scheduled call has ended. In various embodiments of the present invention, the caller on hold may be joined by other callers also on hold for the same scheduled conference call, allowing participating callers on hold to communicate with each other and participate in a sub-conference call of the scheduled conference call.

Password program 142 determines whether the first call has ended (decision block 216). If the first call has not ended (decision block 216, no branch), the caller is placed on, or remains on, hold (step 214). If the first call has ended (decision block 216, yes branch), password program 142 joins the caller to the scheduled call (step 218). In an exemplary embodiment, when the first call ends, the callers on hold are automatically joined to the scheduled conference call. Alternately, the moderator of the scheduled conference call or an operator of conferencing server computer 140 may join the callers on hold to the scheduled conference call. In another embodiment of the present invention, for example, in cases of confidential or secure matters, the caller may be asked to enter a participant password, in addition to the transient password already entered, before receiving access to the scheduled conference call.

Figure 3:
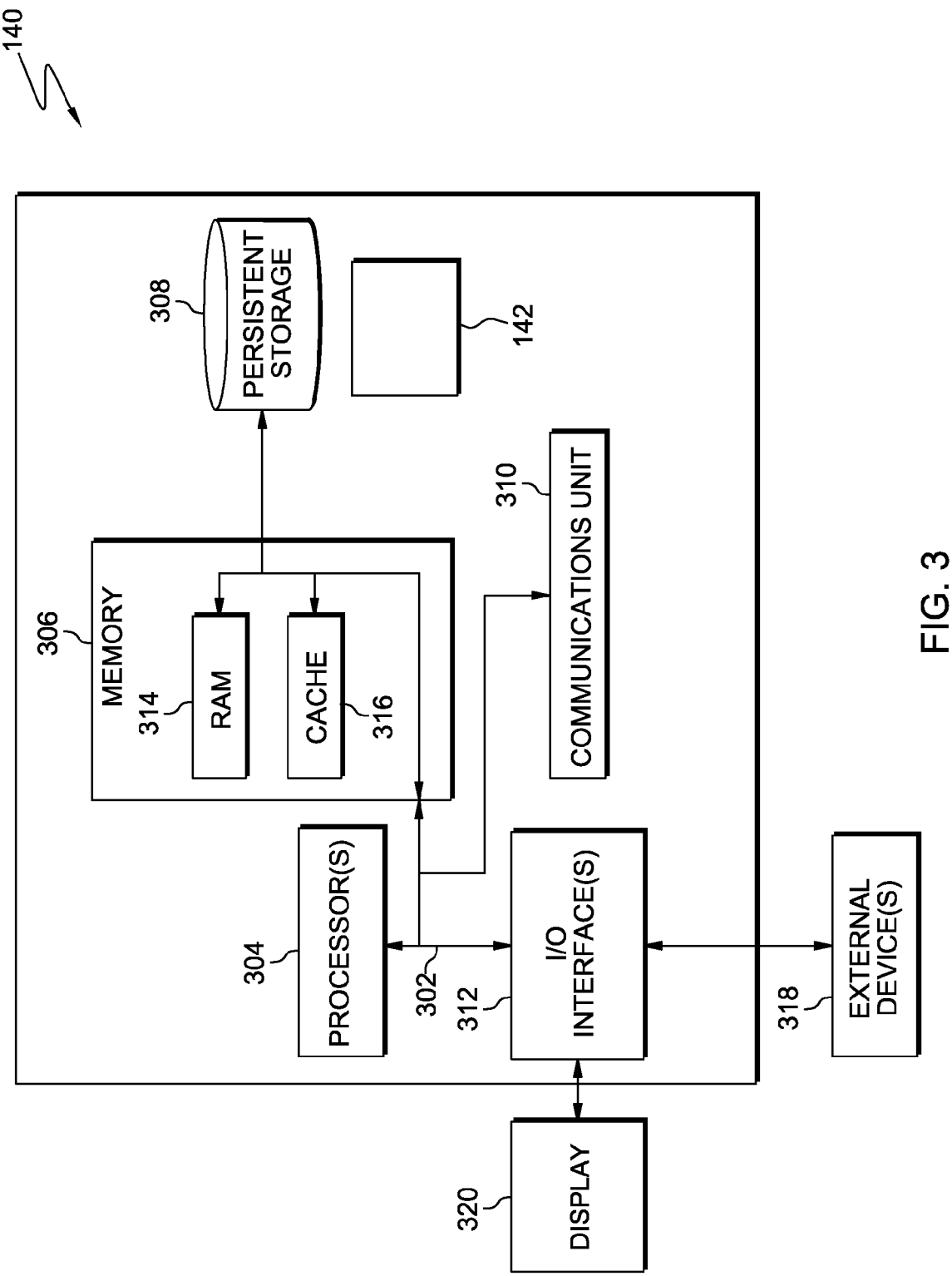
FIG. 3 depicts a block diagram of internal and external components of a data processing system, such as the conferencing server computer of FIG. 1, in accordance with an embodiment of the present invention.

FIG. 3 depicts a block diagram of components of conferencing server computer 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Conferencing server computer 140 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Password program 142 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including participant communication device 120 and moderator communication device 130. In these examples, communications unit 310 includes one or more network interface cards. Communications unit 310 may provide communications through the use of either or both physical and wireless communications links. Password program 142 may be downloaded to persistent storage 308 through communications unit 310.

I/O interface(s) 312 allows for input and output of data with other devices that may be connected to conferencing server computer 140. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., password program 142, can be stored on such portable computer-readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for monitoring and providing access to back to back scheduled conference calls within a teleconferencing system, the method comprising:
    receiving, by one or more computer processors, a call from a caller;
    receiving, by one or more computer processors, a password entry from the caller;
    determining, by one or more computer processors, the password entry is valid for a scheduled conference call;
    determining, by one or more computer processors, the scheduled conference call is scheduled back to back with a previous conference call;
    determining, by one or more computer processors, the previous conference call is not over;
    determining, by one or more computer processors, the password entry is a specific password, wherein the specific password is issued only to callers accessing back to back scheduled conference calls; and
    based, at least in part, upon determining the password entry is the specific password, placing, by one or more computer processors, the caller on hold.

2. The method of claim 1, further comprising:
    determining the previous conference call is over; and
    joining the caller to the scheduled conference call.

3. The method of claim 1, wherein the specific password is issued by a moderator of the scheduled conference call.

4. The method of claim 1, wherein said placing the caller on hold includes joining the caller with one or more other callers for the scheduled conference call, whereby the caller and the one or more other callers may communicate with each other prior to the end of the previous conference call.

5. The method of claim 1, wherein said determining the scheduled conference call immediately follows a previous conference call further comprises one or more of: accessing a calendar of a moderator of the scheduled conference call, receiving scheduling information from the moderator, or receiving scheduling information from an operator of the teleconferencing system.

6. The method of claim 1, further comprising:
    determining the scheduled conference call began at a correct scheduled time;
    determining a second call from a second caller was not received at the correct scheduled time;
    determining a time period has elapsed from the correct scheduled time for the scheduled conference call, wherein the time period is set prior to the scheduled conference call by a moderator of the scheduled conference call or an operator of the teleconferencing system;
    blocking the second caller from the scheduled conference call; and
    issuing a new specific password to the second caller, wherein the new specific password corresponds to a later scheduled call.

7. A computer program product for monitoring and providing access to back to back scheduled conference calls within a teleconferencing system, the computer program product comprising:
    one or more computer-readable tangible storage media and program instructions stored on the one or more computer-readable tangible storage media, wherein the one or more computer-readable tangible storage media is hardware, the program instructions comprising:
    program instructions to receive a call from a caller;
    program instructions to receive a password entry from the caller;
    program instructions to determine the password entry is valid for a scheduled conference call;
    program instructions to determine the scheduled conference call is scheduled back to back with a previous conference call;
    program instructions to determine the previous conference call is not over;
    program instructions to determine the password entry is a specific password, wherein the specific password is issued only to callers accessing back to back scheduled conference calls; and
    based, at least in part, upon determining the password entry is the specific password, program instructions to place the caller on hold.

8. The computer program product of claim 7, further comprising:
    program instructions to determine the previous conference call is over; and
    program instructions to join the caller to the scheduled conference call.

9. The computer program product of claim 7, wherein the specific password is issued by a moderator of the scheduled conference call.

10. The computer program product of claim 7, wherein said program instructions to place the caller on hold include program instructions to join the caller with one or more other callers for the scheduled conference call, whereby the caller and the one or more other callers may communicate with each other prior to the end of the previous conference call.

11. The computer program product of claim 7, wherein said program instructions to determine the scheduled conference call is scheduled back to back with a previous conference call further comprise one or more of: program instructions to access a calendar of a moderator of the scheduled conference call, program instructions to receive scheduling information from the moderator, or program instructions to receive scheduling information from an operator of the teleconferencing system.

12. The computer program product of claim 7, further comprising:
program instructions to determine the scheduled conference call began at a correct scheduled time;
program instructions to determine a second call from a second caller was not received at the correct scheduled time;
program instructions to determine a time period has elapsed from the correct scheduled time for the scheduled conference call, wherein the time period is set prior to the scheduled conference call by a moderator of the scheduled conference call or an operator of the teleconferencing system;
program instructions to block the second caller from the scheduled conference call; and
program instructions to issue a new specific password to the second caller, wherein the new specific password corresponds to a later scheduled call.

13. A computer system for monitoring and providing access to back to back scheduled conference calls within a teleconferencing system, the computer system comprising:
one or more computer processors;
one or more computer-readable tangible storage media, wherein the one or more computer-readable tangible storage media is hardware;
program instructions stored on the one or more computer-readable tangible storage media for execution by at least one of the one or more computer processors, the program instructions comprising:
program instructions to receive a call from a caller;
program instructions to receive a password entry from the caller;
program instructions to determine the password entry is valid for a scheduled conference call;
program instructions to determine the scheduled conference call is scheduled back to back with a previous conference call;
program instructions to determine the previous conference call is not over;
program instructions to determine the password entry is a specific password, wherein the specific password is issued only to callers accessing back to back scheduled conference calls; and
based, at least in part, upon determining the password entry is the specific password, program instructions to place the caller on hold.

14. The computer system of claim 13, further comprising:
program instructions to determine the previous conference call is over; and
program instructions to join the caller to the scheduled conference call.

15. The computer system of claim 13, wherein the specific password is issued by a moderator of the scheduled conference call.

16. The computer system of claim 13, wherein said program instructions to place the caller on hold include program instructions to join the caller with one or more other callers for the scheduled conference call, whereby the caller and the one or more other callers may communicate with each other prior to the end of the previous conference call.

17. The computer system of claim 13, wherein said program instructions to determine the scheduled conference call is scheduled back to back with a previous conference call further comprise one or more of: program instructions to access a calendar of a moderator of the scheduled conference call, program instructions to receive scheduling information from the moderator, or program instructions to receive scheduling information from an operator of the teleconferencing system.

18. The computer system of claim 13, further comprising:
program instructions to determine the scheduled conference call began at a correct scheduled time;
program instructions to determine a second call from a second caller was not received at the correct scheduled time;
program instructions to determine a time period has elapsed from the correct scheduled time for the scheduled conference call, wherein the time period is set prior to the scheduled conference call by a moderator of the scheduled conference call or an operator of the teleconferencing system;
program instructions to block the second caller from the scheduled conference call; and
program instructions to issue a new specific password to the second caller, wherein the new specific password corresponds to a later scheduled call.

* * * * *